United States Patent [19]

Lyman

[11] Patent Number: 4,778,538

[45] Date of Patent: Oct. 18, 1988

[54] DUAL TEMPERATURE SENSING DEVICE HAVING TWIN WELL THERMOWELL FOR DUAL RESISTANCE TEMPERATURE DETECTORS

[75] Inventor: Walter G. Lyman, Monroeville, Pa.

[73] Assignee: Westinghouse Electric Corp., Pittsburgh, Pa.

[21] Appl. No.: 73,666

[22] Filed: Jul. 15, 1987

[51] Int. Cl.$^4$ .................................... H01L 35/02
[52] U.S. Cl. ................... 136/230; 136/232; 136/221; 136/242; 374/208; 376/247
[58] Field of Search .............. 136/230, 232, 233, 242, 136/221; 374/179, 208; 376/247

[56] References Cited

U.S. PATENT DOCUMENTS

| | | | |
|---|---|---|---|
| 1,869,151 | 7/1932 | Jeffery et al. | 136/232 |
| 2,987,565 | 6/1961 | Barnhart et al. | 136/237 |
| 3,041,387 | 6/1962 | Moeller | 136/230 |
| 3,913,058 | 10/1975 | Nishio et al. | 136/230 |
| 3,942,242 | 3/1976 | Rizzolo | 136/233 |
| 4,217,463 | 8/1980 | Swearingen | 136/232 |
| 4,510,343 | 4/1985 | Sivyer | 136/242 |
| 4,552,465 | 11/1985 | Anderson | 374/179 |
| 4,590,326 | 4/1986 | Woldy et al. | 136/233 |
| 4,653,443 | 3/1987 | Fukazawa et al. | 136/230 |

Primary Examiner—Deborah L. Kyle
Assistant Examiner—Michael J. Carone
Attorney, Agent, or Firm—D. C. Abeles

[57] ABSTRACT

A dual temperature sensing device has a twin well thermowell, for installation through a penetration in a pipe wall, and which has head, shank and tip portions. The shank portion has a first part of substantially the same outer dimensions as the penetration and the head portion is of greater outer dimensions so as to define an annular ledge which overlies the exterior surface of the pipe wall, for welding same thereto. The first part of the shank portion is of greater axial length than the pipe wall thickness and a second part thereof is tapered and elongated, for disposing the tip portion within the interior of the pipe. A pair of bores extend from the outer surface of the head portion at angularly inclined and converging relationship to closely spaced, but physically separated, positions in the tip portion. The head is counter-bored relative to the first bores, to define sockets for receiving the lower ends of pipe nipples, the upper ends of which are closed by pipe unions. Dual resistance temperature detectors are received through the respective pipe nipples with the elongated sensors extending through the respective bores to the tip portion of the thermowell, and are resiliently urged into position. Fittings, secured to the electrical cables of the detectors, are received in threaded engagement in the respective pipe unions and are removable for replacement of detectors. The detectors are both electrically and physically separated, and, produce identical, dual temperature indicating outputs.

6 Claims, 5 Drawing Sheets

FIG. 1.

PRIOR ART

FIG. 2.

PRIOR ART

FIG. 3.

PRIOR ART

FIG. 4.

PRIOR ART

DUAL TEMPERATURE SENSING DEVICE HAVING TWIN WELL THERMOWELL FOR DUAL RESISTANCE TEMPERATURE DETECTORS

CROSS-REFERENCE TO RELATED APPLICATION

The subject matter disclosed and claimed herein is related to the subject matter of application Ser. No. 058,956 filed June 5, 1987 in the name of Michael Twerdochlib and entitled "Differential Temperature Sensor and Instrumentation System Incorporating Same for Detecting the Presence of Water."

BACKGROUND OF THE INVENTION

1. Field of the Invention

The present invention generally relates to a device for sensing the temperature of a high temperature and high pressure fluid, such as a reactor coolant fluid in the piping of a nuclear reactor system and, more particularly, to such a dual temperature sensing device having a twin well thermowell for accommodating dual resistance temperature detectors.

2. State of the Relevant Art

Temperature sensing devices are well known and have been used for a variety of purposes, including measuring the temperature of a reactor coolant flowing through conduits including, variously, the hot and cold legs of the system piping of a nuclear reactor system. As explained in more detail hereafter, the phenomenon known as temperature streaming may produce a large temperature gradient in the cross-section of the fluid passing through the piping. This introduces the requirement of obtaining multiple temperature measurements and deriving an average value thereof. As a typical, or practical, example, the temperature measurements are obtained at three (3) locations equiangularly displaced about the circumference of the piping; the respective, measured values at the three locations then are averaged.

Recently, there has arisen a need for an increased number of temperature measurements in this particular environment. The need for deriving an increased number of temperature measurements, however, conflicts with the need to minimize or avoid additional piping penetrations. More particularly, the need to obtain a greater number of temperature measurements arises out of the increasingly stringent regulations regarding adequate safeguards in the operation of nuclear power systems and particularly the requirement that independently derived temperature measurements be supplied to each of the control and protection systems for the reactor. As will be readily appreciated by those of skill in the art, this requirement relates to the ability of the control and protection systems of a nuclear power plant to generate a trip signal in the event that a malfunction is detected as a result of the temperature indication exceeding certain predetermined limits of safe operation. Accordingly, the requirement differs, as between the types of plants.

For example, in a four (4) loop plant, having four (4) sets of control and protection systems and employing a two out of four (2/4) logic, a protection function, such as reactor shut-down, will be initiated if two of the four control and protection systems function to generate a trip signal. Thus, one such control and protection system may be out of service and another (i.e., a second such system) may fail and there will still remain two systems fully functional for generating a trip signal. In each of these four (4) such systems, the temperature indication may be supplied to the protection system first and subsequently through an isolator to the control system.

In the case of a three (3) loop plant, however, employing two out of three ($\frac{2}{3}$) logic, it is necessary to separate the temperature inputs to the protection and control systems since, by comparison to and adopting the same rationale as discussed above regarding four loop plants, assurances must be provided that the failure of the control system will not also produce failure of the associated protection system. As thus will be apparent, if one such control and protection system is out of service and another should fail, the required inputs (i.e., detected temperature conditions) to satisfy the $\frac{2}{3}$ logic are not satisfied. Thus, to meet the more stringent requirements as aforestated, the three loop system requires independently derived temperature indications for each of the protection and control systems of each loop. In the case of two (2) loop plants employing two out of four (2/4) logic, and analogously to the four loop plants, two sets of independent temperature measurements must be derived for each of the two loops and thus for their corresponding control and protection systems.

It is also a requirement that substantially the identical temperature measurements be produced and separately supplied to the control and protection systems, to avoid discrepancies in the operations of the control and protection systems. Because of the temperature streaming phenomenon, deriving two separate and independent average temperature values, each average being obtained from three (3) locations, implies the use of six (6) such independent temperature sensing devices, such as resistance element temperature detectors, and correspondingly the provision of six (6) penetrations of the piping for accommodating the six (6) sensing devices. This, however, conflicts with the requirement of minimizing or avoiding additional piping penetrations. Moreover, due to the temperature streaming phenomenon, produced by the two sets of sensing devices it is difficult, if not impossible, to physically locate the six separate sensing devices and their corresponding penetrations of the piping such that the two average temperature temperatures, each derived from a corresponding set of three (3) independent sensing devices, will be of identical values. As discussed in the following, the prior art simply has not addressed the problems which are solved by the present invention.

Single detector element thermowell devices are well known in the art and one such device is illustrated, for example, in U.S. Pat. No. 4,510,343. The general proposition of mounting two or more thermocouples within a common casing has long been recognized in the art, as evidenced by U.S. Pat. No. 721,770. Thus, the number of temperature measurements may be increased without increasing the number of piping penetrations, simply by installing a dual element resistance temperature detector in a single thermowell. While this, at least in theory, satisfies the general objective of deriving an increased number of measurements, dual element resistance temperature detectors are subject to the common failure of both elements. Particularly in the environment of a nuclear reactor system, and as well in other applications in which highly reliable and accurate measurements of fluid temperature are required, the potential of common failure of both elements of such a dual element detector is unacceptable.

Numerous configurations of multi-point, or multiple element, thermocouple assemblies also have evolved and are known in the art. U.S. Pat. No. 4,075,036, for example, discloses the alternative structure, above-noted, of plural thermocouples disposed within a common shell or protective tube, and purportedly is suitable for use in the adverse environmental conditions of a nuclear system installation; as above-noted, however, the plural thermocouples are subject to common failure and thus such a device is unacceptable for the applications to which the present invention is directed. Additional examples of such structures may be found in U.S. Pat. No. 3,955,419 - Barton et al., assigned to the common assignee of the present invention as well as U.S. Pat. Nos. 4,028,139, 4,162,175, 4,385,197, and 4,410,756. In general, these patents disclose the provision of plural thermocouples disposed at varying locations within a common protective well or tube, and are designed to monitor temperatures at predetermined locations relative to the length of the protective tube and thus within the interior of a vessel or conduit within which the tube is inserted.

None of these prior art configurations, however, addresses the requirement to which the present invention is directed; in fact, the prior art structures have the contrary objective. More specifically, whereas the requirement is to obtain, simultaneously, two independent but substantially identical average temperature measurements at a common axial location, the structures of these above-referenced patents, instead, simultaneously and independently measure temperatures at respective, predetermined and different locations along the length of the protective tube—and necessarily produce temperature output readings of different values.

U.S. Pat. No. 4,186,605 discloses a set of thermocouples for measuring the average of several temperatures at predetermined positions about the interior circumference of a confining structure. The specific structure therein considered is the region of the high speed gas ring formed at the outside of a turbine, such as in a jet engine. As therein disclosed, plural probes, each containing one or more thermocouples, are placed at desired positions distributed in a circle in the gas ring. The number of probes generally is between two and twelve, depending upon the accuracy desired and the acceptable cost for a particular case. In the specific example illustrated, six probes are provided, each containing a thermocouple; the alternative is also suggested of employing several thermocouples in each probe, the hot wells of the thermocouples being located adjacent respective, different points along the length of the corresponding probe. This structure again does not satisfy the requirements to which the present invention is directed, since multiple penetrations are required for the multiple probes. Further, independent temperature measurements are derived from angularly displaced and/or both angularly and radially displaced positions about the interior of the conduit.

Duplex and multiple element thermocouple assemblies, on the other hand, also have been proposed in the prior art. One example thereof is disclosed in U.S. Pat. No. 4,217,463 and particularly comprises an assemblage of two small diameter thermocouples which are soldered into two axial channels which extend along the length of a stainless steel cylinder which forms a portion of a protective fitting for the duplex thermocouple. At the temperature sensing end of the assembly, the ends of the thermocouples project slightly beyond the end of the cylinder, affording a direct immersion-type configuration. The other end of the cylinder is soldered into a hole axially drilled into an end of a larger stainless steel cylinder, the latter having external screw threads for securing the assembly to the sidewall of a conduit or vessel, such as a polyethylene recctor. The opposite end of the larger cylinder extends exteriorly of the vessel and has an axial, partial bore therein in which a further fitting is pressed and soldered in place, and within which the thermocouple leads emerge from the protective sheaths for connection to external leads. The thermocouples are described as being soldered to the supporting structures for completing the sealed relationship. The structure thus disclosed affords dual measurements from substantially adjacent locations within a reactor or other conduit through which a fluid flows. However, the structure fails to satisfy the requirements of the present invention, since the thermocouples are permanently secured in position within the protective cylindrical support structures; hence, should a thermocouple fail, the entire duplex thermocouple assembly would necessarily require replacement, implying shutdown of the polyethylene reactor system with which it is disclosed for use. While a shut-down to replace temperature sensing thermocouples may be acceptable in the operation of a polyethylene reactor, it is highly impractical and unacceptable in the environment of a nuclear reactor, as those of skill in the art will readily appreciate.

Other forms of dual or multiple element temperature sensors are known in the art, such as are disclosed in U.S. Pat. Nos. 3,366,942, 3,898,638 and 4,448,943; these sensors, however, are utilized for the entirely different purpose of flow detection or liquid level detection. These devices employ a pair of related sensors at proximate but displaced positions, one of which is separately heated, for sensing a resultant temperature differential between the positions. Necessarily, such sensors are inherently unsuitable for the purpose of the present invention.

SUMMARY OF THE INVENTION

Accordingly, there exists a need in the art for, and an object of the present invention is to provide, a temperature sensing device which is of robust character and structural integrity, and which provides for simultaneous but independent temperature sensing of a fluid at a common location or position within a confining structure, e.g., a pressure vessel, conduit or piping, through which the fluid flows. A further object is to provide such a device which readily may be installed through the sidewall of the vessel or conduit. Yet another object of the present invention is to provide a temperature sensing device which permits replacement of one or both of the temperature detectors without breaking any fluid seals or requiring shut-down of the system, such as in the event of failure of either or both of the temperature detectors. Yet a further object of the present invention is to provide a twin thermowell device for dual resistance temperature detection functions, a desired number of which devices may be disposed, as required, at angularly displaced positions about the circumference of, and at a desired axial position of, a vessel or conduit, and each of which devices produces two, i.e., first and second, independent sensed temperature outputs of identical value, the plural first outputs and the plural second outputs being averaged as independent sets to produce two substantially identical average temperature values, as is required for the separate control and protection systems of a nuclear reactor system.

More specifically, the twin well thermowell temperature sensing device of the present invention comprises a thermowell body having an enlarged head, which serves as a reinforcing boss, and an integral shank, which extends axially from the head and is received through a corresponding opening, or penetration, provided in the wall of a conduit or other vessel through which a fluid passes and the temperature of which fluid is to be sensed. The shank tapers to a narrow, heat transfer sensitive tip. The body furthermore comprises two wells extending from displaced positions at the upper surface of the head and passing in angularly converging relationship from the head and through the shank portion to proximate but spaced respective positions within the heat sensitive tip. The head furthermore is counter-bored in axial alignment with the twin well bores for receiving th lower ends of a pair of pipe nipples, or tubes, the latter being secured thereto such as by a weld line about the respective circumferences thereof. The pipe nipples are of enlarged interior diameter relative to the thermowells and define housings for accommodating the enlarged upper portion of respective resistance temperature detector devices. Pipe unions are affixed on the upper, free ends of the nipples and define, within the latter, spring chambers for coils springs which resiliently maintain the detectors in position within the thermowell bores. Closure plugs, secured to the detectors are threaded into the respective unions and preferably seal the same, the electrical leads of the detectors passing through the fittings for external connection.

The twin well thermowell structure of the temperature sensing device of the invention thus affords a means of installing two resistance temperature detectors through one piping penetration, while maintaining both physical separation and electrical isolation of the detectors, as is required for providing two separate but identical temperature measurements, such as are required for the protection and control systems, respectively, of a nuclear reactor installation. While the detectors are physically separated, they nevertheless communicate with the fluid to be sensed through a common, heat transfer sensitive tip which assures that the same measurements are derived at each penetration position. Significantly, the thermowell design permits on-line replacement of the temperature detectors. The thermowell design, moreover, may be made as large as necessary to accommodate any specific type of resistance temperature detector and yet requires only a single piping penetration. The thermowell may serve as the reinforcing boss for the installation and thus be welded directly to the piping and eliminate the need for a separate boss; conversely, the thermowell may be installed through an existing nozzle or scoop, such as a hot leg scoop, which is bored out and removed to provide for installation of the thermowell of the invention.

These and other advantages of the dual temperature sensing device having a twin thermowell, of the present invention, will become more apparent from the following detailed drawings, taken in conjunction with the following detailed description of the preferred embodiment of the invention.

DETAILED DESCRIPTION OF THE PREFERRED EMBODIMENTS

Figure 1:
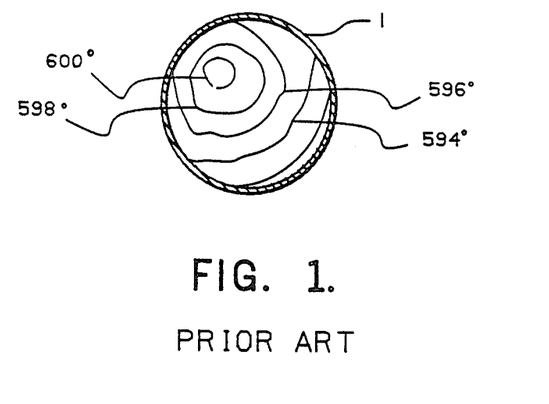
FIG. 1 is a cross-sectional view in schematic form of an outlet piping containing hot fluid which flows therethrough for illustrating an exemplary temperature gradient pattern resultant from the phenomenon of temperature streaming.
Figure 2:
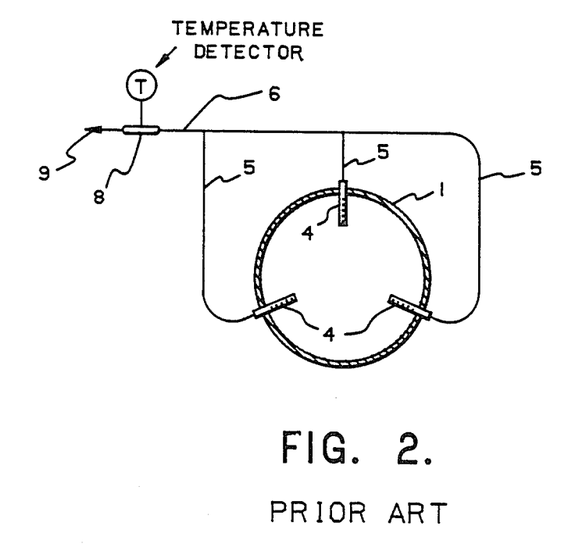
FIG. 2 is a schematic illustration of a prior art system for directly sampling a fluid within a pipe and deriving an average fluid temperature therefrom.
Figure 3:
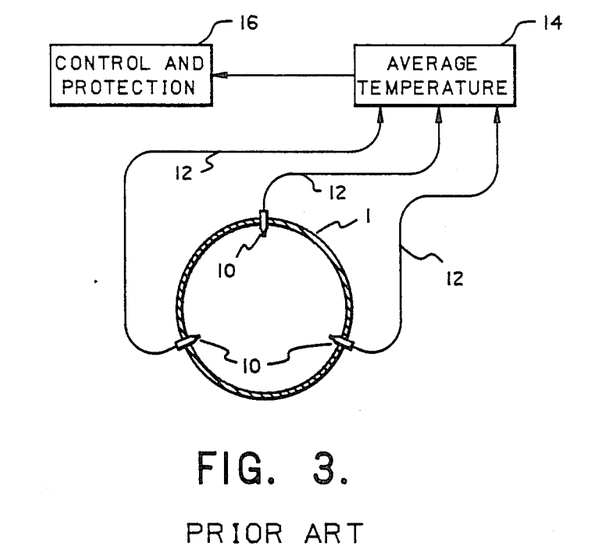
FIG. 3 is a schematic illustration of a prior art system employing plural electrical temperature detectors in corresponding thermowells inserted into a pipe for deriving an electrically generated average temperature indication therefrom, of a fluid in the pipe.
Figure 4:
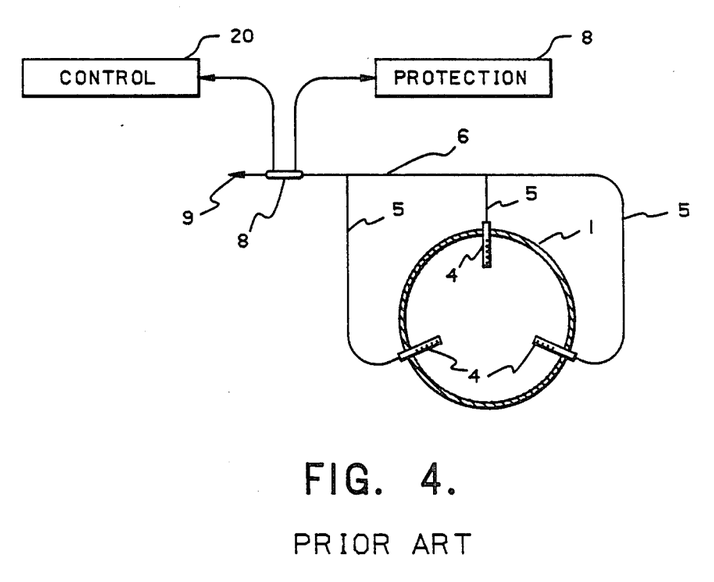
FIG. 4 is a schematic illustration of a prior art system which directly samples fluid within a pipe and derives separate average temperature outputs for supply to respective control and protection systems.

To better understand the present invention, reference is first had to FIGS. 1 through 5 which include schematic illustrations of the temperature streaming and resultant temperature gradients with respect to the cross-sectional area of a fluid flow pattern within piping, such as in a hot water outlet pipe of a nuclear reactor system (FIG. 1), and various examples of various prior art systems employed for developing average temperature indications of such fluid (FIGS. 2-4).

Accurate temperature measurement of a liquid, e.g., water, in the outlet piping of a nuclear reactor vessel is extremely difficult due to the phenomenon known as temperature streaming. As illustratively shown in the schematic and cross-sectional illustration of FIG. 1, within the pipe 1, temperature streaming may produce a large temperature gradient of as much as 10° F., resulting from the incomplete mixing of the water from the reactor core fuel assemblies which may be at different temperatures. Because of this large temperature gradient, a single temperature detector located at any one circumferential point of the pipe 1 may measure a temperature that differs significantly from the true average temperature of the water in the pipe 1.

As before-noted, Various techniques and devices have been developed and pursued in the prior art in an effort to produce a more accurate indication of the average water temperature. Examples thereof are shown in FIGS. 2 through 4.

The prior art technique illustrated schematically in FIG. 2 utilizes a plurality of probes 4, typically three (3) in number, as shown, disposed at equiangular positions about the circumference of the pipe 1; the probes project radially inwardly of the pipe 1 and respectively withdraw relatively low volume, sample amplitude flows which are passed through corresponding connecting pipes 5 and header 6 to a temperature detector 8 and are subsequently returned as indicated by a return line 9 to the system. By combining the flows in the header 6, the temperature sensor 8 responds to the combined sample flow and thus presumably to an average value of the actual flow within the pipe 1. Whereas the combined actual sampling technique of such a system does improve the reliability of the average temperature indication thus derived, a system as in FIG. 2 introduces additional problems, such as leakage of radioactive water. As will be appreciated, while FIG. 2 is only schematic in nature, suitable valves, connecting flanges and fluid control devices are required in any actual implementation of the direct sampling technique illustrated in FIG. 2.

FIG. 3 illustrates yet another prior art system, which is somewhat of an electrical analogy to the fluid sampling system of FIG. 2. As shown, typically three (3) such thermowells 10 are employed, disposed at equiangularly displaced positions. Electrical outputs over leads 12 of the temperature detectors of the thermowells 10 are combined in an average temperature determining circuit 14 and the resultant average temperature indications are supplied to control and protection systems 16. While such a prior art system does serve to produce an average temperature indication and avoids the problems of potential leakage and personnel exposure as is presented by a fluid sampling system of the type of FIG. 2, it readily will be appreciated that the required generation of separate but identical average temperature indications for supply to respective control and protection systems, for example as required in 2- and 3-loop systems as above described, is not satisfied by the prior art system of FIG. 3.

FIG. 4 is a schematic illustration of a prior art system employing direct fluid sampling as in the case of the system of FIG. 2 but wherein separate average temperature indications may be derived. Since the fluid sampling system may be the same as that of FIG. 2, the elements are correspondingly identically identified in FIG. 4. The sole exception is that a temperature detector 8' now produces separate, average temperature outputs for the control and protection systems 18 and 20. Whereas this system does generate average temperature indications from the common, mixed sample flow, it is subject to the deficiencies and potential hazards of fluid sampling systems, as before-noted with respect to the system of FIG. 2.

Figure 5:
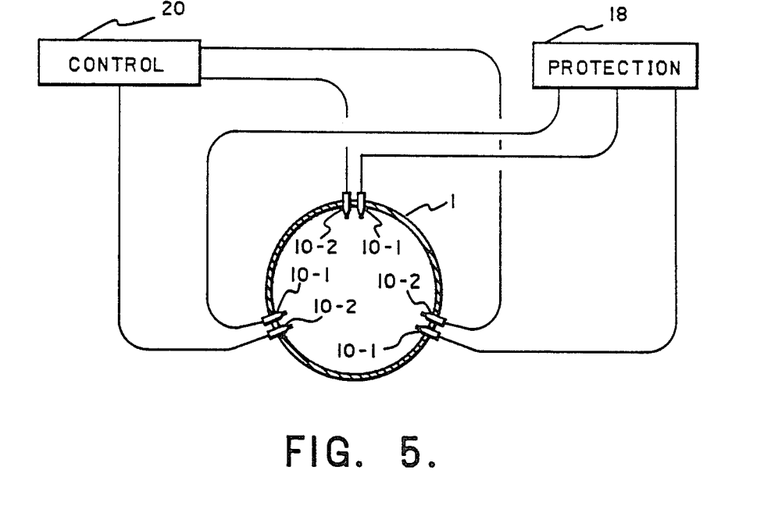
FIG. 5 is a schematic illustration of a prior art system employing plural electrical temperature detectors in a plurality of corresponding thermowells inserted into a pipe for deriving corresponding, plural separate temperature indications of fluid within the pipe and providing two average temperature outputs for supply to respective control and protection systems.

FIG. 5 illustrates what might be termed a brut force method of satisfying the requirement, that mechanically and electrically separate average temperature indications be derived for the respective protection and control systems 18 and 20. In essence, and as before described, two sets of three thermowells each, i.e., a first set of three therthermowells 10-1 and a second set of three thermowells 10-2, are mounted through corresponding penetrations in the piping 1, and the average values of the respective sets of thermowells 10-1 and 10-2 then are derived by the corresponding average temperature circuits 14-1 and 14-2 for supply to the associated protection system 18 and control system 20. In the configuration shown, this requires a total of six penetrations about a common circumference of the pipe 1, which is an undesirable structural provision. Moreover, by reference to the temperature streaming phenomenon and resultant temperature gradients shown in FIG. 1, it will be appreciated that the average temperature indication output from the set of thermowells 10-1 may not be identical to that from the set of thermowells 10-2.

As was also before-noted, a single set of three thermowells 10 as shown in FIG. 3 could be fitted with two detectors in each thermowell 10 and the outputs of first and second sets thereof separately combined and averaged for supply to separate, respective control and protection systems. That approach, however, is unacceptable since the failure of one thermocouple may well result in failure of the other since the two lack physical isolation. By contrast, the physical isolation of the system of FIG. 5 is unacceptable due to weakening of the pipe 1 by the increased number of thermowells and corresponding penetrations and, moreover, may result in discrepancies due to the lack of identity of the two separate average temperature indications which are generated due to the temperature streaming phenomenon.

Figure 6:
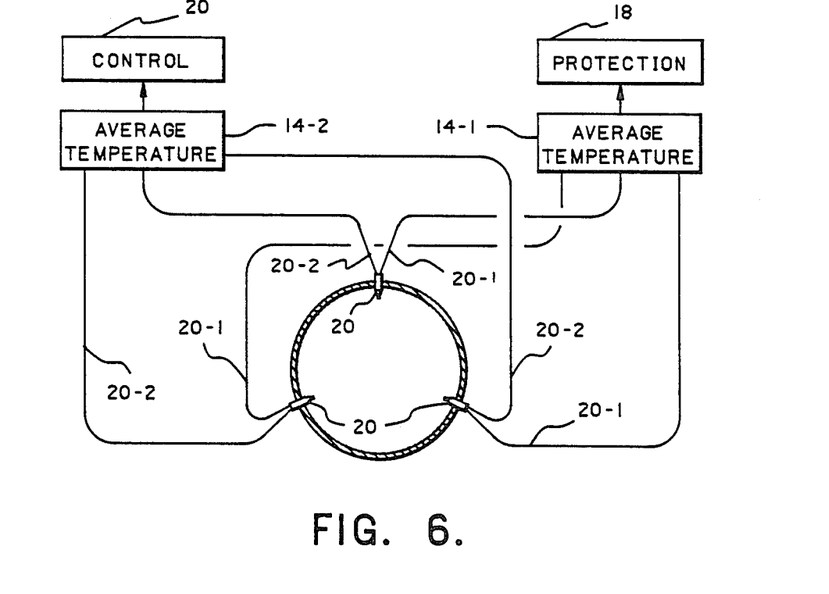
FIG. 6 is a schematic illustration of a temperature sensing system employing plural twin well thermowells in accordance with the present invention, inserted within a pipe for deriving two separate, but identical, average temperature indications of a fluid within the pipe, for supply to respective control and protection systems.

These apparently, irreconcilable problems and deficiencies which reside within the prior art systems are overcome through use of the twin thermowell of the present invention, the same being mounted as schematically indicated in FIG. 6. Particularly, each of the thermowells 20 in FIG. 6 includes a pair of physically isolated resistance temperature detectors, schematically indicated by the corresponding electrical outputs 20-1 and 20-2, and which produce simultaneous and identical, respective temperature indication outputs. The temperature indication outputs on the lines 20-1 and those on the lines 20-2 are respectively combined and averaged by the corresponding average temperature circuits 14-1 and 14-2 and the resultant, two average temperature indication outputs correspondingly are provided to the respective protection and control systems 18 and 20.

Figure 7:
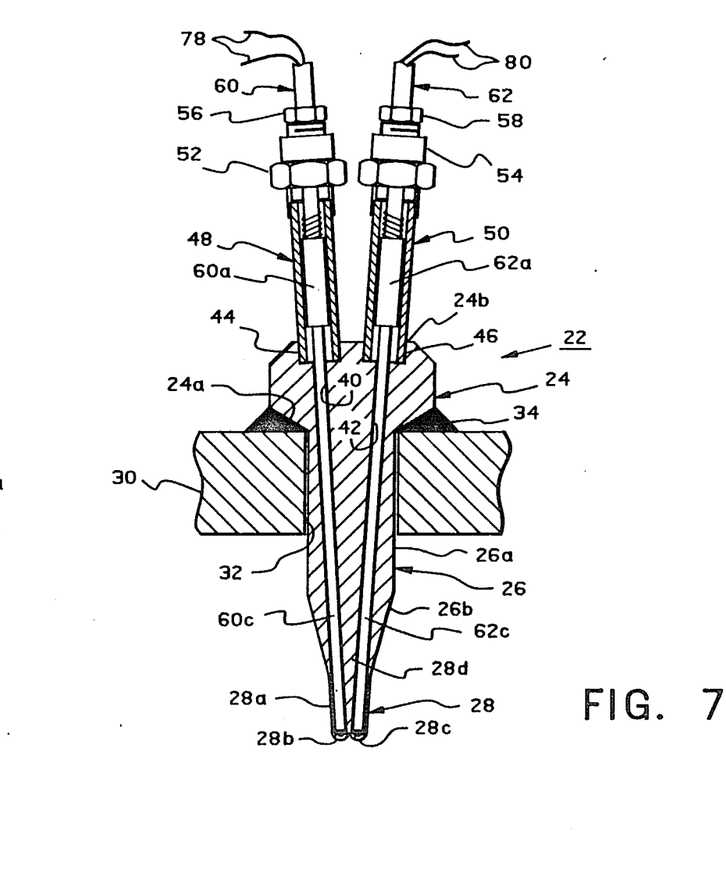
FIG. 7 is a vertical elevational view, partially in cross-section, of a temperature sensing device incorporating the twin well thermowell of the present invention.

FIG. 7 is a cross-sectional, elevational view of a dual temperature sensing device 20 incorporating a twin well thermowell 22, in accordance with the present invention, for accommodating dual resistance temperature detectors 60 and 62. The twin well thermowell 22 is formed of a solid block of metal and is machined to include, in integral relationship and axial alignment, a head portion 24, a shank portion 26 and a thin-walled, heat transfer tip portion 28. The thermowell 22 is received through a hole or penetration 32 in the sidewall of a pipe 30. Shank portion 26 includes a first, generally cylindrical section 26a of greater axial length than the thickness of the sidewall of pipe 30 and a tapered section 26b which joins the tip portion 28. The generally cylindrical portion 26a has substantially the same outer dimensions as the hole 32 in the sidewall 30. The corresponding portions of the thermowell 22 may be of circular cross-section in a plane perpendicular to its axis, although that is not necessarily limiting or essential. The head portion 24 is of greater outer dimensions than the cylindrical shank portion 26a so as to define an annular ledge or undercut surface 24a overlying the outer surface of the pipe 30 about the hole 32, and is welded thereto as indicated by weld line 34. The head portion 24 defines an outer end surface 24b which preferably is generally planar and transverse to the axis of the body 24.

A pair of bores 40 and 42 extend from the outer surface 24a of the head portion 24 to the tip portion 28, the tip portion 28 thus defining a generally circumferential closure wall 28a surrounding the bores 40 and 42, generally curved or contoured end closure walls 28b and 28c aligned with the respective bores 40 and 42, and an internal partition 28d which physically separates the bores 40 and 42 from each other. The bores 40 and 42 have corresponding, substantially straight bore axes and preferably are of circular cross-section and thus comprise elongated, small diameter cylindrical bores. The bore axes extend in symmetrical and angularly inclined, converging relationship from displaced positions on the outer surface 24a of the head 24 to closely adjacent but physically separate positions in the tip portion 28.

The head portion 24 further is counterbored, relative to the bores 40 and 42, to define respective receiving sockets 44 and 46 which receive the lower ends of pipe nipples 48 and 50, respectively. The interior surfaces of sockets 44 and 46 may be threaded to match external threads on the lower ends of the pipe nipples 48 and 50, or the latter may be received in the receiving sockets and welded in position. Pipe unions 52 and 54 are secured on the upper, free ends of the pipe nipples 48 and 50 and respectively receive fittings 56 and 58 therein, preferably with mating threaded surfaces. Fittings 56 and 58 are secured to protruding ends of resistance temperature detectors 60 and 62, respectively, and secure same within the pipe unions 52 and 54.

Figure 8:
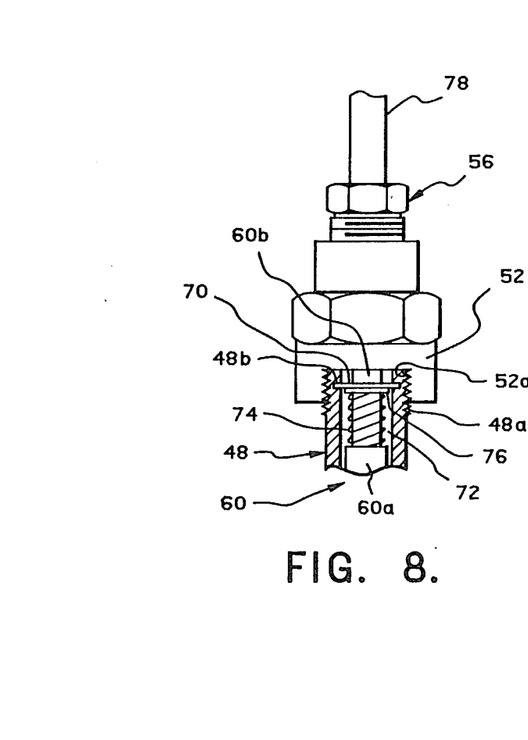
FIG. 8 is an enlarged view of a portion of the temperature sensing device of FIG. 7.

FIG. 8 is an enlarged view of a portion of the pipe nipple 48 and its associated union 52 and related structures, and will be understood to be representative of nipple 50, pipe union 54 and related structures. In FIG. 8, nipple 48 is seen to have an outer threaded surface 48a which is engaged by the inner threaded surface 52a of the pipe union 52. A radially outward, annular groove 48b is formed on the interior surface at the upper end of nipple 48, and receives a retaining ring 70 having a central aperture through which the upper, reduced diameter portion 60b of the resistance temperature detector 60 extends. The retaining ring 70 defines a spring chamber 72 within the nipple, relative to the enlarged portion 60a of detector 60. Coil spring 74 is received in chamber 72, positioned about the portion 60b; it supports a washer 76 thereabove, in abutting engagement with the retaining ring 70. The coil spring 74 thus resiliently urges the detector 60 downwardly. With reference to FIG. 7, the elongated sensor shafts 60c and 62c of the detectors 60 and 62 thus are resiliently urged downwardly into the respective bores 40 and 42, to insure intimate contact with the thin circumferential wall 28a and end closure walls 28b and 28c of tip portion 28. It thus will be appreciated that the two sensor shafts 60c and 62c are in intimate contact with the tip portion 28 and through it with the fluid within the pipe 30 and that the two necessarily will be maintained at the identical temperature and yet are physically isolated. By the provision of the symmetrically inclined and converging axes of the bores 40 and 42 in progressing from the head portion 24 to the tip portion 28, adequate separation is afforded to accommodate the nipples 48 and 50 and to permit manipulation of the fittings 56 and 58 for ease of insertion and removal of the detectors 60 and 62. The fittings 56 and 58 are affixed to the multiple conductor cables 78 and 80 of the detectors 60 and 62 and thus serve to stabilize and secure the latter to the respective pipe unions 52 and 54.

It thus will be appreciated that the dual temperature sensing device of the invention and particularly the twin thermowell thereof may be readily installed through a suitable penetration in the pipe sidewall and welded securely in place. The respective temperature detectors are subjected to the identical temperature conditions through the common heat transfer sensitive tip 28, and yet are physically separated and provide electrically separated outputs.

Figure 9A:
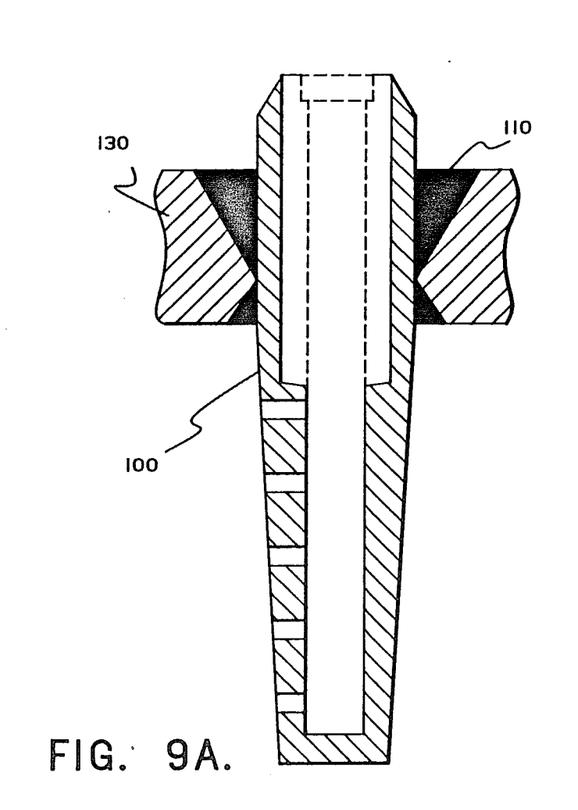
FIGS. 9A and 9B are partially schematic, cross-sectional and elevational views of successive steps in the installation of a twin well thermowell of the present invention in a hot leg scoop, machined to accommodate same.
Figure 9B:
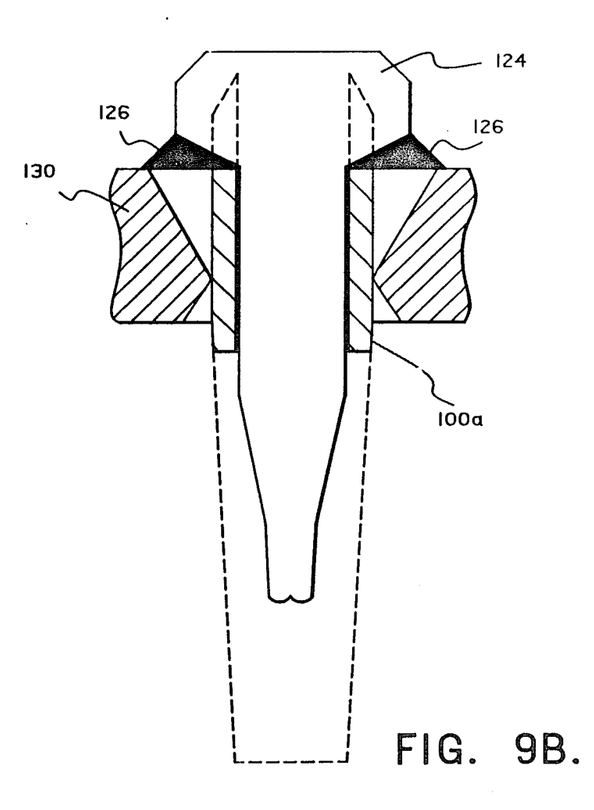

An alternative mounting arrangement for the thermowells of the invention is shown in FIG. 9A and FIG. 9B. In FIG. 9A, a scoop 100 of conventional type is mounted through a penetration in the sidewall of a tube 130 and welded in position as shown at 110. To prepare the scoop 100 to accommodate a thermowell of the invention, the scoop 100 is removed so as to retain only the cylindrical sidewall portion 100a as shown in FIG. 9B. A twin well thermowell body 124, shown only in outline form in FIG. 9B but otherwise conforming to the configuration thereof shown for example in FIG. 7, then is inserted through the retained cylindrical wall 100a of the former scoop 100 and welded in position by weld bead 126, thereby to achieve the structurally analogous arrangement of FIG. 7.

The dual temperature sensing device having a twin well thermowell in accordance with the present invention thus affords the requisite physical isolation of two separate resistance temperature detectors while assuring that the same are subjected to the identical temperature environment whereby the separate electrical outputs therefrom are substantially identical and indicate a temperature at a common position or location within the pipe or other structure in which the device is mounted. Nevertheless, the device requires only a single penetration through the sidewall of the pipe or other such structure. The use of plural, e.g., three (3), dual temperature sensing devices of the invention, in an installation and associated system as shown in FIG. 6, thus satisfies the requisite structural and functional requirements for producing separate but identical first and second average temperature indications for control and protection systems, respectively.

Numerous modifications and adaptations of the present invention will be apparent to those of skill in the art and thus is intended by the appended claims to cover all such modifications and adaptations which fall within the true spirit and scope of the invention.

I claim as my invention:

1. A twin well thermowell for installation through a penetration, of a predetermined cross-sectional dimension, in a pipe wall of a given pipe wall thickness, comprising:
   a metallic body defining an elongated axis and having integrally connected and axially aligned head, shank and tip portions, the head portion being of an enlarged outer cross-sectional dimension relative to the shank portion and defining an outer surface, the shank portion having integrally connected first and second axial sections, the first axial section being of approximately the predetermined cross-sectional dimension and of an axial length in excess of the given pipe wall thickness, and the second axial section being integrally connected to the tip portion, the tip portion having a cross-sectional dimension substantially less than that of the first axial section of the shank portion, and the second axial section of the shank portion having a cross-sectional dimension which tapers from the integral connection thereof with the first axial portion to the integral connection thereof with the tip portion; and a pair of bores extending through the body from the outer surface of the head portion to the tip portion, said bores defining corresponding, substantially straight bore axes and the bore axes extending in symmetrical and angularly inclined, converging relationship from displaced positions on the outer surface of the head portion to closely spaced, physically separated positions in the tip portion.

2. A twin well thermowell as recited in claim 1, wherein said tip portion comprises:

a thin circumferential wall and an end closure wall surrounding the bores; and a central partition extending between said bores and defining the closely spaced, physically separated positions of said bores in the tip portion of said body.

3. A twin well thermowell as recited in claim 2, wherein:

said head portion defines an annular, undercut surface at the integral connection thereof to said shank portion for defining an annular gap relative to the pipe wall when the tip and shank portion of the thermowell are inserted through a penetration in the pipe wall, to enable forming a weld bead therebetween.

4. A twin well thermowell as recited in claim 2, further comprising:

means for mounting a pair of temperature detectors in said thermowell, each said temperature detector comprising, in axial alignment, a first, generally cylindrical central portion of a first diameter and having first and second ends, a second generally cylindrical portion of a second diameter less than the first diameter and having first and second ends, the second end of the second cylindrical portion extending from said first end of said first cylindrical portion and an elongated shaft extending from the second end of the first cylindrical portion, each shaft having a diameter less than that of the bores and being insertable into a respective one of the pair of bores and having a length sufficient to extend from an abutting relationship with the end closure wall surrounding the respective bore and dispose the second end of the first cylindrical portion adjacent the outer end surface of the head portion.

5. A twin well thermowell as recited in claim 4, wherein said mounting means further comprises:

a pair of receiving sockets formed in the head portion in axial alignment with respective ones of the pair of bores in the thermowell;

a pair of pipe nipples each having first and second ends, the first end of each of the pair of pipe nipples being received in a respective one of the pair of receiving sockets and secured to the head portion;

a pair of pipe unions each having first and second ends, the first end of each pipe union being affixed to the second end of a respective one of the pair of pipe nipples; and a pair of fittings each having first and second ends, the first end of each fitting being selectively engagable with the second end of a respective one of the pair of pipe unions and the second end of each thereof extending beyond the second end of the respective pipe union.

6. A twin well thermowell as recited in claim 5, wherein:

each said pipe nipple is of an axial length, relatively to the first, central cylindrical portion of said temperature detector, so as to define an annular spring chamber between the second end of the first cylindrical portion of the temperature detector and the second end of the respective pipe nipple; and there is further provided a pair of coil springs, each received within a respective annular spring chamber coaxially about the second cylindrical portion of the temperature detector, each coil spring having a first end, disposed in abutting relationship with the first cylindrical portion of the temperature detector, and a second end; and means disposed at the second ends of the respective pipe nipples for engaging the second ends of the respective coil springs and resiliently urging the respective temperature detectors into the corresponding bores of the thermowell, to maintain the abutting relationship of the shafts of the respective temperature detectors and the tip portion of the thermowell.

* * * * *